United States Patent [19]

Arnold

[11] Patent Number: 4,628,996
[45] Date of Patent: Dec. 16, 1986

[54] FULL OPENING CHECK VALVE

[76] Inventor: James F. Arnold, 950 Echo La., Suite 125, Houston, Tex. 77024

[21] Appl. No.: 578,477

[22] Filed: Feb. 9, 1984

[51] Int. Cl.$^4$ .............................................. E21B 33/12
[52] U.S. Cl. .................................... 166/116; 166/187; 137/67; 137/68.1; 137/71; 137/498; 137/504; 137/853
[58] Field of Search .................... 137/67, 68 R, 69, 71, 137/460, 498, 504, 517, 853; 166/187, 314, 116; 175/318; 138/45

[56] References Cited

U.S. PATENT DOCUMENTS

| | | | |
|---|---|---|---|
| 1,977,504 | 10/1934 | Brown | 138/45 X |
| 3,283,823 | 11/1966 | Warrington | 175/321 X |
| 3,444,897 | 5/1969 | Erickson | 138/45 |
| 3,557,812 | 1/1971 | Stedfeld | 137/69 |
| 3,970,105 | 7/1976 | Pelton | 137/498 |
| 4,092,999 | 6/1978 | Rubrich | 137/504 |
| 4,105,050 | 8/1978 | Hendrickson | 137/517 X |
| 4,308,885 | 1/1982 | Geisseler | 137/67 |

FOREIGN PATENT DOCUMENTS 516793  2/1955  Italy ..................................... 137/517

Primary Examiner—Harold W. Weakley
Attorney, Agent, or Firm—Hubbard, Thurman, Turner & Tucker

[57] ABSTRACT

In accordance with the invention, a full opening check valve is provided which will close in response sustained high velocity flow through the valve. In one embodiment, a downhole blowout preventer is provided having a rigid outer sleeve which may be interspaced within a casing string near its lower end for insertion into a bore hole. The downhole blowout preventer has an inner sleeve including an upwardly longitudinally collapsible tube within the outer sleeve. The tube may be composed primarily of rubber or the like. The inner sleeve includes a surface for developing an upwardly acting collapsing force responsive to the upward flow of well fluids through the blowout preventer. The inner sleeve resists the action of the collapsing force developed by the upward flow of well fluids at ordinary velocities during ordinary operation, but increased upward flow velocities of well fluids associated with downhole blowouts develop a larger collapsing force sufficient to overcome the resistance of the inner sleeve and collapse the tube upwardly and inwardly within the outer sleeve, thereby blocking the bore hole. Preferably, the tube is reinforced with rigid hoops and flexible strands to promote the inward overlapping folding of the tube upon collapse. The resistance of the tube to collapse under ordinary flow may be the result of bonding agents, shearable pins, friction, weight or the longitudinal stiffness of the tube within the outer sleeve. In another embodiment, the inner sleeve is adapted to collapse in response to a sustained high velocity flow in either direction. This embodiment may be used in pipelines such as pressurized gas collection or distribution lines to isolate breaks in the system.

24 Claims, 12 Drawing Figures

FULL OPENING CHECK VALVE

BACKGROUND OF THE INVENTION

This invention relates generally to a full opening check valve and in one particular application concerns a downhole blowout preventer which may be inserted into a casing string of an oil and gas well and conventionally cemented into the well and which may be used in conjunction with conventional surface blowout preventers.

Blowout preventers such as the commonly used ram type mounted at the surface of the earth are required both by good drilling practice for enhanced safety, environmental protection and economical operation and by government regulation. However it is desired to augment the protection of a surface mounted blowout preventer with a downhole blowout preventer which will permit the removal and insertion of conventional well tools and the conventional upward annular flow of drilling fluids.

Prior attempts to construct a successful downhole blowout preventer have not solved this problem. For example, Smith U.S. Pat. No. 2,647,728, discloses a depending hollow rubber cone device for insertion into a drill string. The bore through the cone permits the conventional downward flow of drilling fluids through the drill string, but when any reverse flow is encountered, the cone will collapse thereby preventing upward flow. The Smith device does not have the ability to permit upward flow at ordinary velocities while preventing upward flow at increased velocities which is essential to a blowout preventer designed for operation in the annulus surrounding the drill string.

Strickland U.S. Pat. No. 4,308,918, discloses an elongated sliding collar member located around a section of drill pipe. An upper rubber portion of the collar is expandable to casing diameter when the sudden pressure surge of a blowout urges the collar upward over a plurality of tapering wing flanges mounted to the drill pipe above the collar. Strickland U.S. Pat. No. 4,295,529, discloses a downhole blowout preventer having two circumferential drill stem mounted assemblies each of which partially blocks the annular space. Upward motion of the lower assembly responsive to a sudden pressure surge moves it into contact with the upper assembly where the two combine to substantially block the annulus. Both of the Strickland blowout preventers suffer the disadvantage of reducing the annular flow area at the blowout preventer, thus risking the sealing of the annulus by the action of well fluids and the solids suspended therein under normal operating conditions in the absence of a blowout. Additionally, since both are drill string mounted units, neither can act to prevent a blowout when the drill string has been pulled from the well.

Other downhole devices such a packers disclose expandable sleeves for blocking an annular space, such as are disclosed in Lynes U.S. Pat. No. 3,235,017, Brown U.S. Pat. No. 3,068,942, Lynes U.S. Pat. No. 2,997,107, Tamplen U.S. Pat. No. 3,784,214, Layne et al. U.S. Pat. No. 2,082,113, Alley U.S. Pat. No. 2,217,038, and Bettis U.S. Pat. No. 2,125,665. Page U.S. Pat. No. 3,050,132 discloses an inwardly acting pressure operated mechanical shut off for a drill string, while McMurry U.S. Pat. No. 3,601,191 and Pranger U.S. Pat. Nos. 2,303,090 and 2,243,439 disclose bellows-like constructions.

The Layne et al. U.S. Pat. No. 2,082,113 discloses well packer for sealing between a pipe or casing and a well bore. The packer of Layne et al. includes a pipe with a tubular mandrel telescopingly mounted thereto. The pipe and mandrel are held in an axially extended or elongated configuration by a shear pin. The packer also includes a packing element which covers the mandrel and which is attached at one end to the mandrel and at the other end to the pipe. The packer of Layne et al. is set by shearing the shear pin and moving the mandrel telescopingly inward with respect to the pipe, thereby to crumple or fold the packing element about the mandrel. The packing element may include a plurality of axially spaced apart hoops or confining wires for controlling the folding of the packing element. The packer may also include support fingers adjacent either end of the parking element for supporting the parking element during setting.

Therefore, it is an object of the present invention to provide a downhole blowout preventer which will block the annulus of a well bore in response to sustained high velocity upward flow of well fluids through the blowout preventer.

It is a further object of the invention to provide a downhole blowout preventer which may be inserted into a casing string and conventionally cemented into the well bore.

It is a further object of the invention to provide a downhole blowout preventer which will seal the well bore in the absence of a drill string or other well tool within the casing.

It is a further object of the invention to provide a downhole blowout preventer which does not significantly obstruct the annular space or restrict the upward flow of well fluids and suspended solids under ordinary drilling conditions.

It is a further object of the invention to provide a downhole blowout preventer which may be inserted into the well using conventional methods.

It is a further object of the invention to provide a downhole blowout preventer which will permit the insertion and removal of well tools in a conventional manner.

It is a further object of the invention to provide a downhole blowout preventer which will minimize the risk of casing blowout below the surface mounted blowout preventer.

It is a further object of the invention to provide a full opening check valve which will close in response to sustained high-velocity flow through the valve.

It is a further object of the invention to provide a full opening two way check valve which will close in response to sustained high velocity flow through the valve in either direction.

SUMMARY OF THE INVENTION

In accordance with the invention, a full opening check valve is provided which will close in response to sustained high velocity flow through the valve. In one embodiment, a downhole blowout preventer is provided having a rigid outer sleeve which may be interspaced within a casing string for insertion into a bore hole. The downhole blowout preventer has an inner sleeve including an upwardly longitudinally collapsible tube within the outer sleeve. The tube may be composed primarily of rubber or the like. The inner sleeve includes a surface for developing an upwardly acting collapsing force responsive to the upward flow of well fluids through the blowout preventer. The inner sleeve resists the action of the collapsing force developed by the upward flow of well fluids at ordinary velocities during ordinary operation, but increased upward flow velocities of well fluids associated with downhole blowouts develop a larger collapsing force sufficient to overcome the resistance of the inner sleeve and collapse the tube upwardly and inwardly within the outer sleeve, thereby blocking the bore hole. Preferably, the tube is reinforced with rigid hoops and flexible strands to promote the inward overlapping folding of the tube upon collapse. The resistance of the tube to collapse under ordinary flow may be the result of bonding agents, shearable pins, friction, weight or the stiffness of the tube within the outer sleeve. The invention may also be used as a storm choke.

In another embodiment, the inner sleeve is adapted to collapse in response to a sustained high velocity flow in either direction. This embodiment may be used in pipelines such as pressurized gas collection or distribution lines to isolate breaks in the system.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
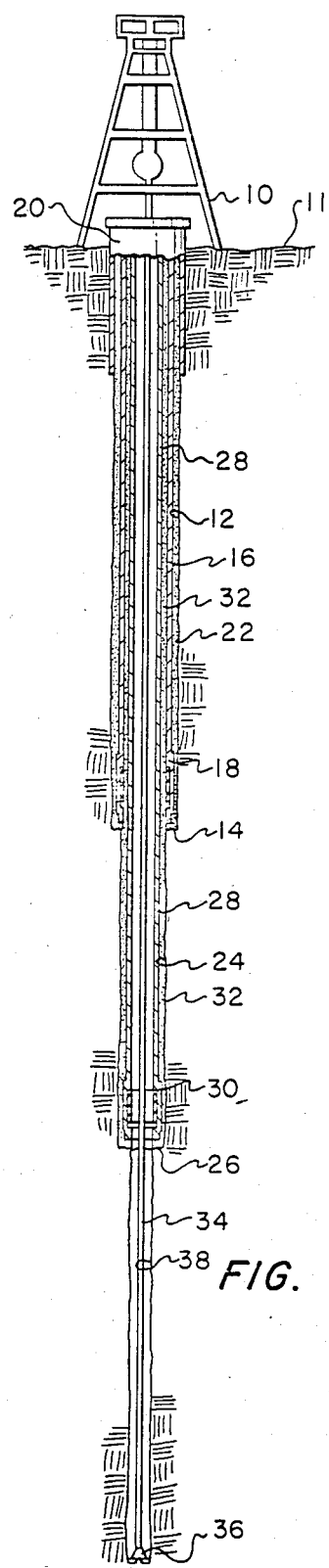
FIG. 1 is a vertical sectional view of two downhole blowout preventers of the present invention in their operating environment within a bore hole.

Turning first to FIG. 1, there is shown a drilling rig 10 at the surface of the earth 11. The rig 10 has previously made a large diameter bore hole 12 to a depth 14 and a string of surface casing 16 has been inserted therein. The casing string 16 includes a downhole blowout preventer 18 of the present invention. An additional, conventional blowout preventer 20 is used at the surface of the earth 11. The surface casing string 16, including the downhole blowout preventer 18, has been cemented into place by cement 22 in the conventional known manner.

Figure 2:
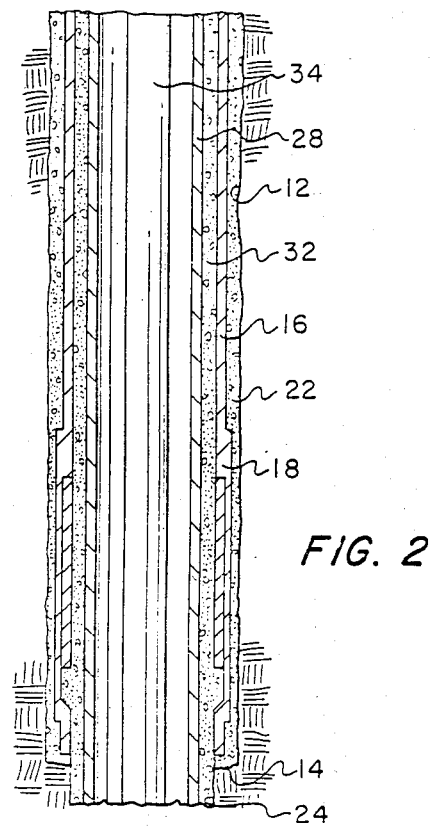
FIG. 2 is a vertical sectional view of the uppermost downhole blowout preventer shown in FIG. 1, which has been rendered inactive by the insertion of additional casing into the bore hole.
Figure 3:
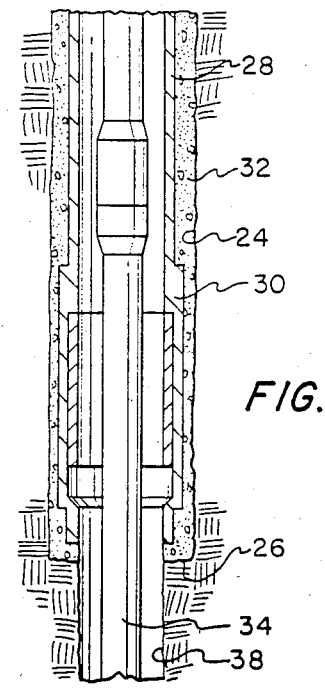
FIG. 3 is a vertical sectional view of the lowermost downhole blowout preventer shown in FIG. 1, shown in use.

A drill string, not shown, was then inserted into the surface casing to drill out the cement plug, not shown, at the depth 14 and to continued drilling the hole 24 below the depth 14. During the drilling of this hole 24, the downhole blowout preventer 18 was active in a manner to be described to prevent a blowout of the well. When the hole 24 was drilled to a depth 26, the drill string was withdrawn and a second casing string 28 was inserted into the bore hole. This otherwise conventional casing string 28 includes a second downhole blowout preventer 30 near its lower end. Both the casing string 28 and the downhole blowout preventer 30 are of a narrower outer diameter than the inner diameter of the surface casing string 16 and first downhole blowout preventer 18, so that they could be inserted therethrough. This second casing string 28, including the downhole blowout preventer 30, was cemented in the conventional manner by cement 32. The insertion of the second casing string 28 and the cement 32 embedded the first downhole blowout preventer 18 in cement and rendered it inactive, as is shown in FIG. 2 in more detail. However, the inclusion of the second downhole blowout preventer 30 in the second casing string 28 continued the downhole blowout protection provided by the present invention, as is shown in FIG. 3.

Finally, a drill string 34 including a drill bit 36 was inserted down through the casing string 28 and downhole blowout preventer 30 to drill out the cement plug, not shown, at the depth 26 and to continue drilling the hole 38. During the drilling of the hole 38, the blowout preventer 30 acts to prevent a blowout of the well.

Figure 4:
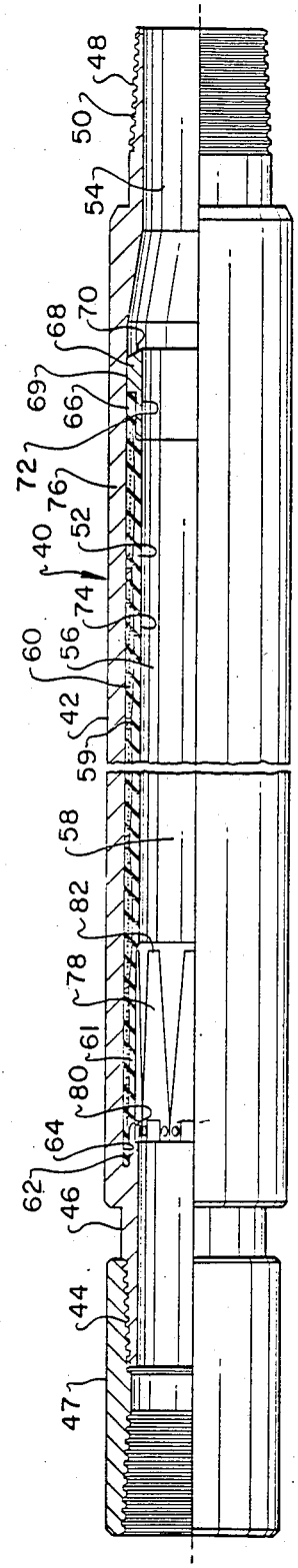
FIG. 4 is a partial sectional view of the downhole blowout preventer of the present invention in its open condition.
Figure 5:
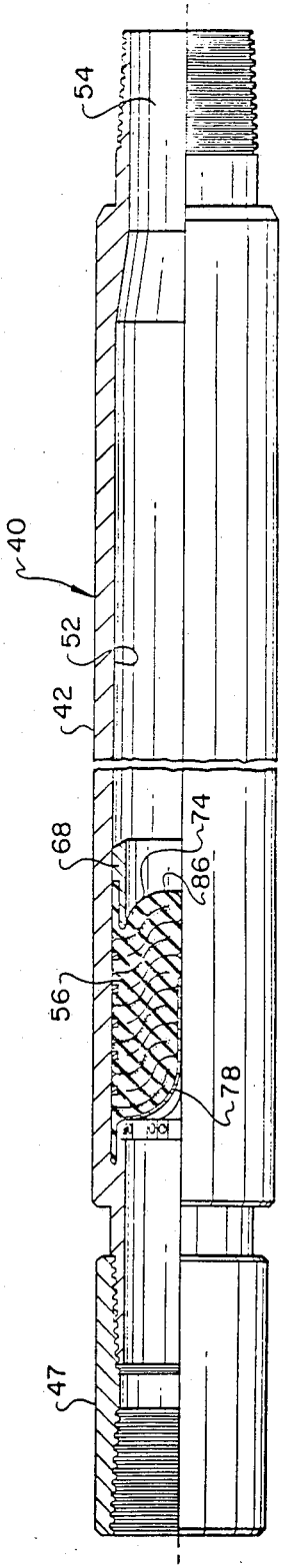
FIG. 5 is a partial sectional view of the downhole blowout preventer of the present invention in its blocked condition.

A downhole blowout preventer 40 of the present invention is shown in both its normal, open condition in FIG. 4 and its collapsed, blocked condition in FIG. 5, in which it has blocked the bore hole so as to prevent a blowout of the well. As is best shown in FIG. 4, the downhole blowout preventer 40 is provided which includes a rigid outer sleeve 42 having threads 44 at its upper end 46 and similar threads 48 at its lower end 50 for interconnection with adjacent casing, not shown, at either end such as by a coupling 47. The outer sleeve is provided with a circular inner face 52 of constant cross sectional diameter over a significant portion of the total length of the outer sleeve 42. The outer sleeve 42 has a continuous bore 54 therethrough.

Figure 8:
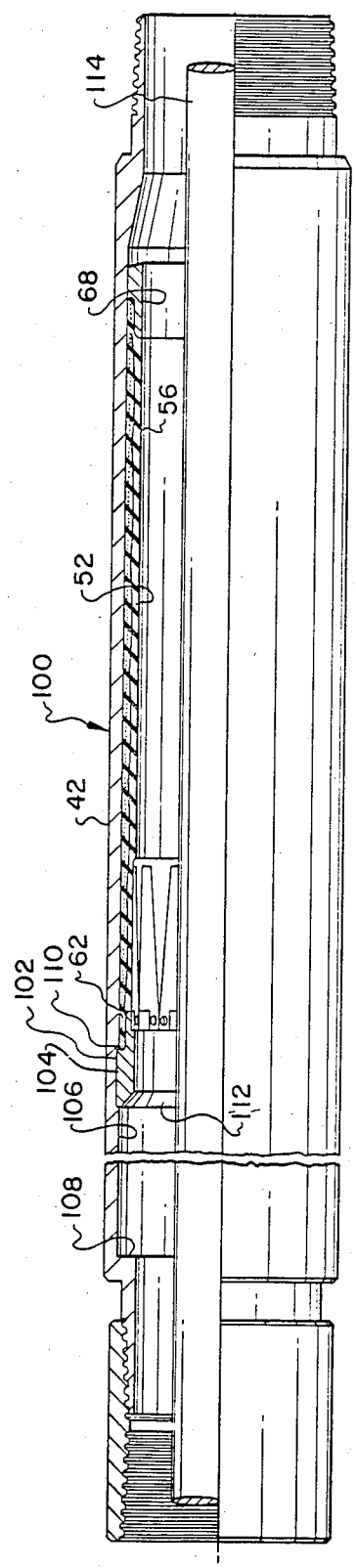
FIG. 8 is a partial sectional view of another downhole blowout preventer of the present invention having a slidable upper collar.

The downhole blowout preventer 40 also includes an inner sleeve 56 which includes a longitudinally collapsible and inwardly foldable tube 58 which may be primarily composed of rubber or the like. The tube 58 is preferably provided with a plurality of spaced apart rigid reinforcing hoops 59 embedded therein. Preferably, the hoops 59 are spaced apart by a distance greater than the diameter of the hoops 59, so that the tube material between adjacent hoops 59 may fold to the center of the bore 54 when the tube 58 is collapsed. It is also preferred that the tube 58 be provided with flexible reinforcing strands 60 for added strength as well as for preventing the reinforcing hoops 59 from separating from the tube 58. The wall thickness of the tube 58 may be varied to promote more orderly folding. As shown in FIG. 8, those portions of the wall 61 of the tube 58 which will be folded into the center of the bore 54 may be thinner than the portions of the tube wall 61 adjacent the embedded hoops 59. The reinforcing strands 60 may be fiber such as nylon, kevlar, aramid, or rayon or may be fine metallic wire. An upper end 62 of the tube 58 may be secured to the inner face 52 of the outer sleeve 42 by a groove 64 provided therein for that purpose, thus preventing the upper end of the tube 58 from moving with respect to the outer sleeve 42.

A plurality of downwardly depending, downwardly narrowing fingers 78 may be provided at the upper end 62 of the tube 58 close fitting relation with the wall 61 of the tube 58. In the downhole blowout preventer 40, upper ends 80 of the fingers 78 are rigidly attached to the outer sleeve 52 adjacent the groove 64 and the upper end 62 of the tube 58. The fingers 78 themselves may be composed of spring steel so that they are both flexible and resilient. The fingers 78 are preferably formed to press tightly against the wall 61 of the tube 58 so that they do not restrict the upward passage of well fluids or well tools.

Figure 9:
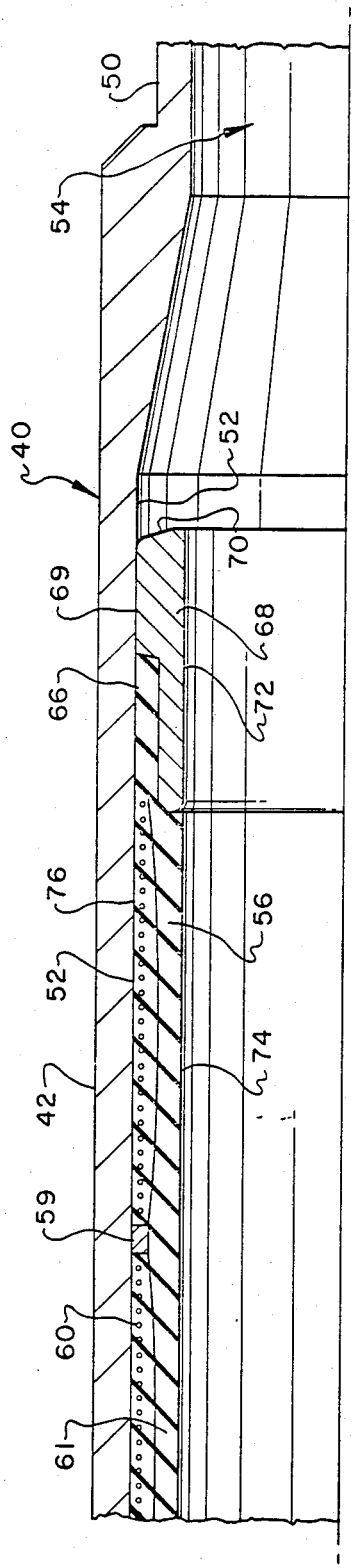
FIG. 9 is a partial sectional detail of the lower collar and tube of the blowout preventer shown in FIG. 4.

A lower end 66 of the tube 58 may be provided with a rigid lower collar 68 which is longitudinally slidable within the outer sleeve 42, as is shown in greater detail in FIG. 9. In the embodiment shown in FIG. 4, the friction between a circular cylindrical outer face 69 of the lower collar 68 and the inner face 52 of the outer sleeve 42 prevents the lower collar 68 from sliding longitudinally within the outer sleeve 42 under ordinary conditions.

Under ordinary conditions within a well bore, well fluids flow upwardly through the bore 54 of the downhole blowout preventer 40 at a relatively predictable velocity. This velocity can be controlled by the driller at the surface of the earth. The upwardly flowing well fluids contact a lower face 70 of the lower collar 68 having a transverse exposure to the flow of the well fluids. The well fluids also contact an inner face 72 of the lower collar 68 and an inner face 74 of the tube 58, exerting drag. In response, the lower face 70 and inner faces 72 and 74 develop an upwardly directed collapsing force which acts upon the lower collar 68. The collapsing force developed at normal well fluid flow velocities is not sufficient to overcome the resistance of the frictional engagement of the lower collar 68 with the outer sleeve 42, and therefore the lower collar 68 and the tube 58 do not move.

Returning to FIG. 1, it can be seen that if the drill bit 36 should strike gas compressed within the earth, the release of this gas into the bore hole 38 would cause a vastly increased and sustained flow velocity of well fluids and gas upwardly through the downhole blowout preventer 30. Should this sustained upward flow continue unrestrained, the well may blow out. Under this condition, the downhole blowout preventer 30 of this invention is designed to act.

Returning once again to the downhole blowout preventer 40 shown in FIGS. 4 and 5, can be seen that the lower face 70 and inner faces 72 and 74 will develop a greatly increased upward collapsing force in response to the vastly increased sustained upward velocity of the well fluids through the blowout preventer 40. This increased collapsing force is sufficient to overcome the frictional resistance of the lower collar 68 to upward movement within the outer sleeve 42. As the lower collar moves upwardly, the tube 58 collapses upwardly and folds inwardly to block the bore 54. The reinforcing hoops 59 and interconnecting reinforcing strands 60 insure that the upward collapse results in the orderly inward folding of the tube 58. As the upper end 62 of the tube 58 collapses upwardly, the fingers 78 adjacent thereto are forced to deform inwardly into contact with each other to form a downwardly narrowing cone, thereby preventing the tube from being forced upwardly past the upper end 62 of the tube 58. In conjunction with the lower collar 68, the hoops 59 and strands 60 further insure that the tube 58 will not turn itself inside out.

Figure 10:
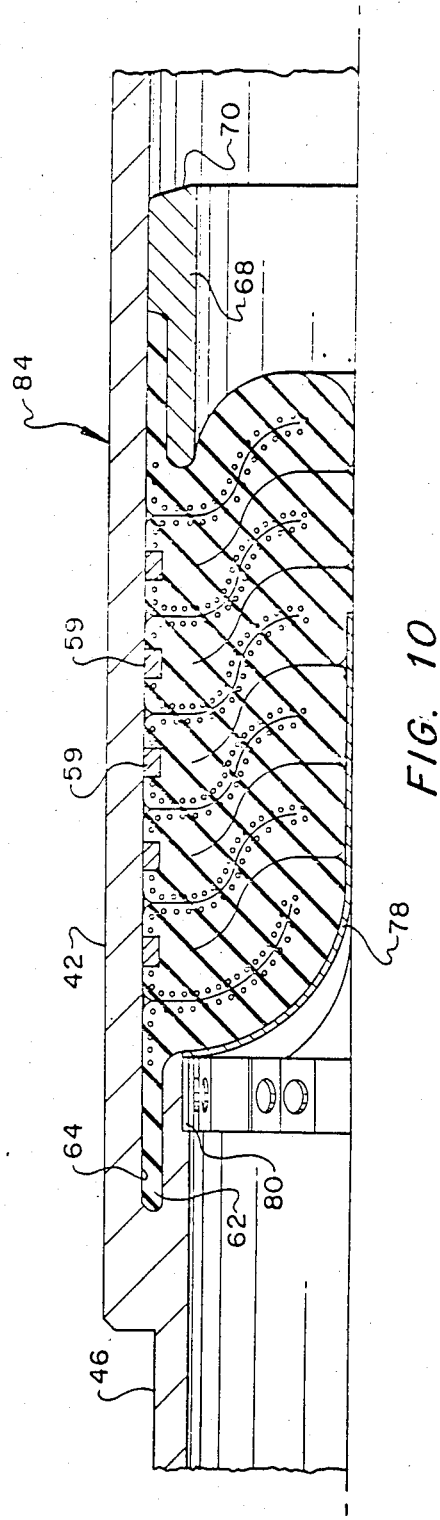
FIG. 10 is a partial sectional detail of the collapsed and folded tube of the blocked blowout preventer shown in FIG. 5.

As is shown in FIG. 5, as the collapsing tube 58 approaches its upper end 62, the fingers 78 are deformed inwardly to further prevent the tube 58 from passing upwardly past its upper end 62. As the upward collapse of the tube 58 continues, fluid pressure on an exposed lower surface 86 thereof urges the tube into its fully collapsed position, as shown in FIGS. 5 and 10.

Figure 6:
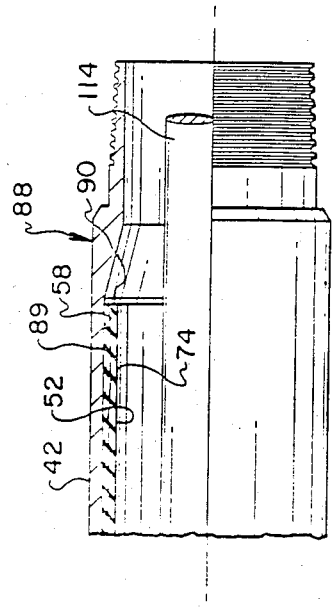
FIG. 6 is a partial sectional view of an alternative downhole blowout preventer of the present invention having no lower collar.

An alternative downhole blowout preventer 88 is shown in FIG. 6. It is identical to the downhole blowout preventer 40 shown in FIG. 4 except that no lower collar is provided. Instead, a lowermost outer face of the tube 58 is bonded to the adjacent inner face 52 of the outer sleeve 42 by a suitable bonding agent. This bond provides the resistance to the upward collapsing force developed by the inner face 74 and a lower face 90 of the tube 58 responsive to the ordinary upward flow of well fluids through the blowout preventer 88. The bond shears under the increased upward collapsing force of the blowout condition described above, and the tube 58 collapses upwardly as above described. It may also be seen that the lower collar 68 of the blowout preventer 40 shown in FIG. 4 may be similarly bonded to the inner face 52 of the outer sleeve 42.

Figure 7:
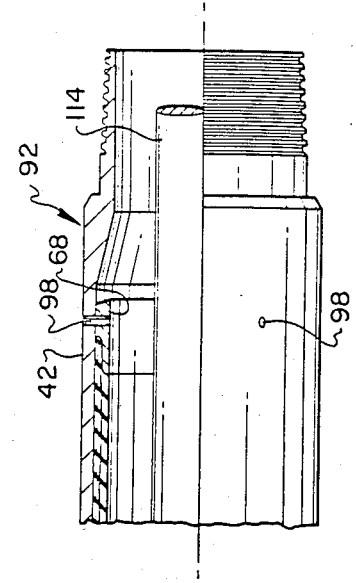
FIG. 7 is a partial sectional view of another alternative downhole blowout preventer of the present invention having the lower collar pinned to the outer sleeve.

FIG. 7 shows another alternative downhole blowout preventer 92 similar to the blowout preventer 40 shown in FIG. 4 except that the lower collar 68 is restrained from collapsing upwardly responsive to ordinary upward flow of well fluids by a plurality of shear pins 98 which connect the lower collar 68 to the outer tube 42 of the blowout preventer 92. The pins 98 are designed to shear under the influence of the greatly increased upward collapsing force developed by a blowout condition so that the tube 58 collapses upwardly in the same manner described above with respect to the blowout preventer 40.

FIG. 8 shows another downhole blowout preventer 100 which is provided with an upwardly slidable upper collar 102 at an upper end 62 of the tube 58. An outer face 104 of the upper collar 102 has a slightly larger diameter than the inner face 52 of the outer sleeve 42 adjacent the tube 58. The outer sleeve 42 has a second inner face 106 of diameter corresponding to that of the outer face 104 extending upwardly from the outer face 104 to a shoulder 108. A second shoulder 110 separates the inner face 52 from the second inner face 106 and also prevents the upper collar 102 from sliding downward past the shoulder 110 toward the lower end of the blowout preventer 100. A sloped upper surface 112 of the upper collar 102 prevents well tools and the like from becoming hung upon the upper collar 102 while being inserted into the well bore. The downwardly depending fingers 78 are rigidly attached to the upper collar 100.

The operation of the downhole blowout preventer 100 is similar to that of the downhole blowout preventer 40 shown in FIG. 4. However, when the upward collapsing force increases in response to blowout conditions, overcoming the resistance of the lower collar 68 to upward movement, the entire inner sleeve 56, including the tube 58, the lower collar 68 and the upper collar 102, moves upwardly at an increasing velocity. This upward travel is suddenly halted by the impact of the upper collar 102 against the shoulder 108, so that the upward momentum of the moving inner sleeve 56 assists in collapsing the tube 58 and blocking the well bore in the manner previously described.

As is shown in FIGS. 6, 7 and 8, the upward annular flow area of the downhole blowout preventer is not restricted even when a drill string 114 is in place within the blowout preventer. Should a blowout occur with the drill string 114 in place, the tube 58 collapses upwardly and folds inwardly into contact with the drill string 114.

The weight of the lower collar 68, the stiffness of the tube 58, or friction between the tube 58 and the inner surface 52 of the outer sleeve 42 may all contribute in varying degrees to the resistance of the tube 58 to the collapsing force developed during ordinary operation of the well. The contribution of the weight of the lower collar 68 may be easily calculated so long as the well bore is substantially vertical. The stiffness of the tube 58 is enhanced by the transverse bracing provided by the adjacent outer sleeve 42, which minimizes the unbraced length of the tube 58 under a compression load. The fluid pressure within the tube 58 presses it outwardly against the inner surface 52 of the outer sleeve 42, thereby developing friction between them. This friction may be minimized or controlled by the insertion of a lubricating or anticorrosive substance between the tube 58 and the outer sleeve 42.

Figure 11:
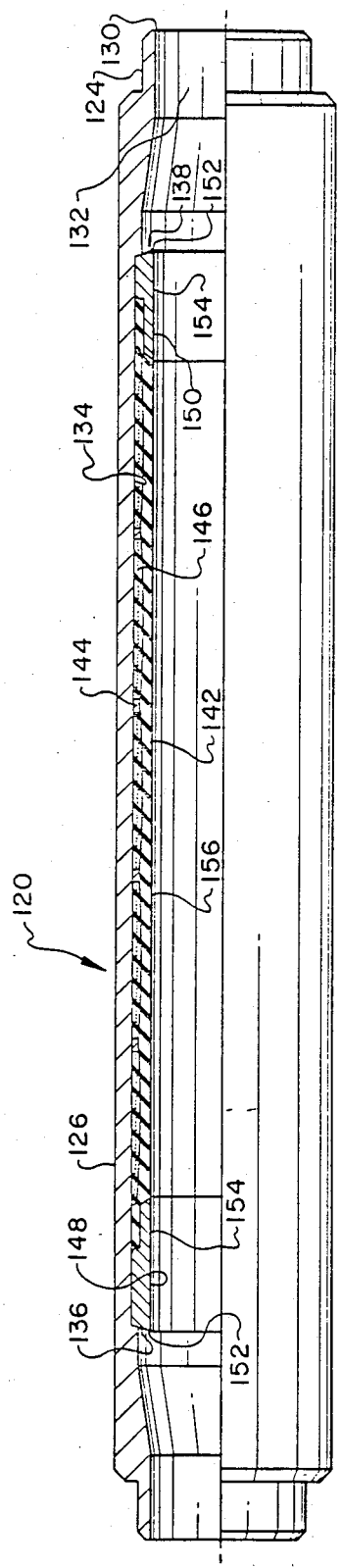
FIG. 11 is a partial sectional view of an alternative full opening two way check valve of the present invention.

FIG. 11 shows an alternative full opening two way check valve shown generally by the numeral 120. This check valve 120 is designed to close in reaction to sustained high velocity flow in either direction through the check valve 120. The check valve 120 may thus be used in pressurized gas collection or gas distribution pipelines to isolate a pipeline break occurring on either side of the check valve 120. The construction of the left end 122 of the check valve 120 is identical to that of the right end 124, since the check valve 120 operates identically in either direction.

The check valve 120 is provided with a rigid outer sleeve 126 which is adapted at ends 128 and 130 for welded connection to adjacent tubular members, not shown, such as in a pipeline. The check valve 120 is provided with a bore 132 extending completely therethrough and having the same inner diameter at the ends 122 and 124 thereof as the adjacent tubular members. The outer sleeve 126 further includes an inner face 134 intermediate the ends 122 and 124 which inner face 134 has a constant circular diameter which is larger than that of the adjacent tubular members. Shoulders 136 and 138 are provided at opposed ends of the inner face 134.

An inner sleeve 140 is provided between the shoulders 136 and 138. Said inner sleeve 140 includes a longitudinally collapsible and inwardly folding tube 142 which is similar to the tube 58 previously described. The tube 142 also includes a plurality of spaced apart rigid reinforcing hoops 144 interconnected by embedded flexible reinforcing strands 146, similar to the tube 58. Identical collars 148 and 150 are provided at opposed ends of the tube 142. The collars 148 and 150 are similar to the lower collar 68 previously described, as they are slidable within the inner face 134. Both collars 148 and 150 are retained in their respective places abutting the shoulders 136 or 138 within the rigid outer sleeve 126 by one or more of the various retaining means previously described. Each collar has an end face 152 having transverse exposure to the flow of fluids as well as an inner substantially parallel face 154. These two faces, together with an inner face 156 of the tube 142, develop a collapsing force in the manner previously described.

It can be seen that the inner tube 140 of the check valve 120 will collapse and block the bore 132 therethrough in the manner previously described in response to sustained high velocity flow of fluids therethrough. The check valve 120 differs from the downhole blowout preventers previous described in that its symmetrical construction allows it to perform its check valve function in response to sustained high velocity flow in either direction. In such a case the upstream collar is urged in the downstream direction, collapsing the tube 142 into the center of the bore 132 as previously described. The check valve 120 is therefore especially adapted for use to isolate breaks in a pressurized gas collection or distribution system where the location of such a pipeline break cannot be predicted.

Figure 12:
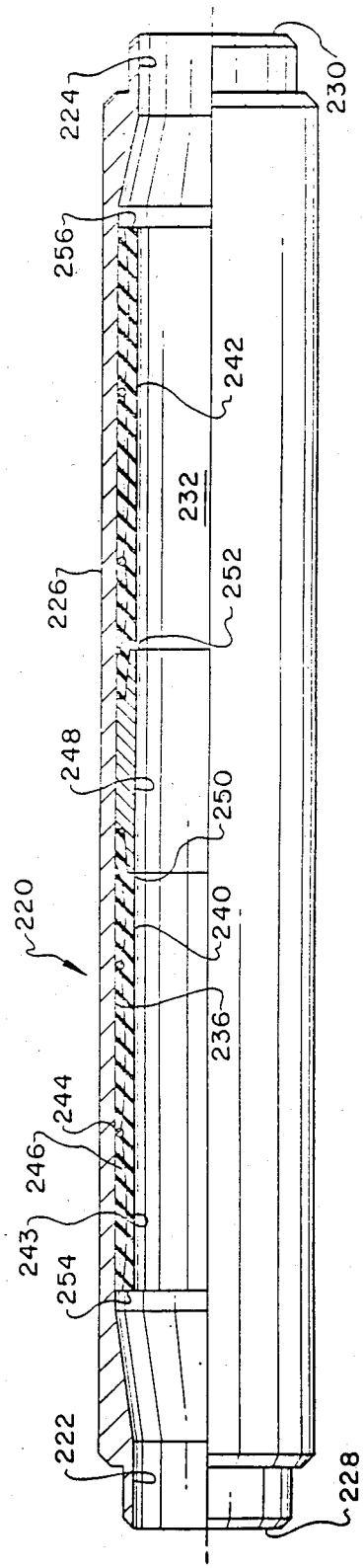
FIG. 12 is a partial sectional view of a second alternative full opening two way check valve of the present invention.

Referring now to FIG. 12, there is shown an alternative embodiment of the two way full opening check valve of the present invention, which is designated generally by the numeral 220. Check valve 220 includes a rigid outer sleeve 226 which is adapted at ends 228 and 230 for welded connection to adjacent tubular members (not shown) such as in a pipeline. Check valve 220 includes a bore 232 extending completely therethrough and having the same inner diameter at its ends 222 and 224 as the adjacent tubular members. Outer sleeve 226 includes a central portion 236 intermediate ends 222 and 224 having an enlarged inner diameter.

Check valve 220 includes a pair of axially extending spaced apart inner sleeves 240 and 242. Sleeves 240 and 242 are of substantially identical construction. Inner sleeve 240 includes a longitudinally collapsible and inwardly foldable tube 243, which preferably is composed primarily of rubber or the like. Tube 43 preferably has a plurality of spaced apart rigid reinforcing hoops 244 embedded therein. Tube 243 also preferably includes a layer of reinforcing strands 246.

Tubes 240 and 242 are anchored within sleeve 226 by means of a mounting collar 248. Mounting collar 248 is adapted at its ends 250 and 252 to connect with inner sleeves 240 and 242, respectively, thereby to fix the inner ends of inner sleeves 240 and 242 within outer sleeve 226. The axially outer ends 254 and 256 of inner sleeve are bonded to inner surface 236 of outer sleeve 226, in the manner described with respect to FIG. 6. The bond and/or the stiffness of tubes 240 and 242 provide resistance to inward collapsing forces developed responsive to ordinary flows within bore 232. However, in response to increased velocity flow, inner tube 240 or 242 will collapse.

Thus it is apparent that there has been provided, in accordance with the invention, a full opening check valve that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A check valve, which comprises:
    a rigid tubular outer sleeve having a longitudinal bore therethrough and means at the ends thereof for interconnecting said outer sleeve with adjacent tubular members;
    a collapsible tubular inner sleeve positioned longitudinally within said bore of said outer sleeve, said inner sleeve having a longitudinal bore for the substantially unobstructed flow of fluids in either direction therethrough, said inner sleeve in the collapsed position having a plurality of multiple, longitudinally spaced, concentric, overlapping inward folds;
    means for resisting the action of inner sleeve collapsing forces developed responsive to normal flow velocity of fluids through said inner sleeve bore and for developing collapse of said inner sleeve in response to greater than normal flow velocity,
    wherein said inner sleeve essentially plugs said bore during greater than normal flow velocity by longitudinally collapsing and forming a plurality of inward folds thereby obstructing fluid flow.

2. The check valve of claim 1, wherein an outer surface of said inner sleeve is in close fitting relation with an inner surface of said outer sleeve.

3. The check valve of claim 1, wherein said inner sleeve has a plurality of spaced apart, substantially rigid reinforcing hoops embedded therein.

4. The check valve of claim 1, wherein said inner sleeve has flexible reinforcing strands embedded therein.

5. The check valve of claim 1, wherein the thickness of the wall of said inner sleeve varies so as to promote and control the inward folding of said inner sleeve when said inner sleeve collapses.

6. The check valve of claim 1, wherein said collapsing force developing means includes a surface having a transverse exposure to fluids flowing through the check valve.

7. The check valve of claim 1, wherein said inner sleeve further includes a rigid first collar coaxially connected to a first end of said tube, with an outer surface of said first collar being in close fitting relationship with an inner surface of said outer sleeve.

8. The check valve of claim 2, wherein said means for resisting includes the bonding of said first collar to said inner surface of said outer sleeve.

9. The check valve of claim 7, wherein said means for resisting includes a shear pin shearably connecting said first collar to said outer sleeve.

10. The check valve of claim 7, wherein said means for resisting includes the weight of said first collar.

11. The check valve of claim 7, wherein said means for resisting includes the frictional engagement of the outer surface of said first collar with said inner surface of said outer sleeve.

12. The check valve of claim 1, wherein said means for resisting includes the bonding of a first end of said inner sleeve to an inner surface of said outer sleeve.

13. The check valve of claim 1, wherein said means for resisting includes the stiffness of said inner sleeve.

14. The check valve of claim 1, wherein a second end of said inner sleeve is immovably attached to said outer sleeve.

15. The check valve of claim 1, wherein said inner sleeve further includes a second collar connected to a second end of said tube with an outer surface of said second collar in longitudinally slidable, close fitting relation with an inner surface of said outer sleeve.

16. The check valve of claim 15, wherein said outer sleeve further includes a shoulder for limiting the travel of said second collar.

17. The check valve of claim 1, further comprising a plurality of fingers in close fitting relation with the inner surface of said inner sleeve with a base of each finger being connected to a second end of said inner sleeve.

18. The check valve of claim 17, wherein the base of each finger is wider than a tip thereof.

19. The check valve of claim 1, further comprising a lubricant between an inner face of said outer sleeve and an outer face of said tube.

20. A downhole blowout preventer adapted for inclusion in a casing string in a well bore below the surface of the earth, which comprises:
    a rigid tubular outer sleeve having a longitudinal bore therethrough and means at the ends thereof for connecting said outer sleeve with axially adjacent portions of said casing string;
    a collapsible tubular inner sleeve positioned longitudinally within said bore of said outer sleeve, said inner sleeve having a longitudinal bore for the substantially unobstructed flow of well fluids and passage of equipment therethrough, said inner sleeve in the collapsed position having a plurality of multiple, longitudinally spaced, concentric, overlapping inward folds;
    and means for resisting the action of inner sleeve collapsing forces developed responsive to the normal flow velocity of well fluids through said inner sleeve bore and for developing collapse of said inner sleeve in response to greater than normal flow velocity, wherein said collapse of said inner sleeve in response to greater than normal flow velocity essentially obstructs fluid flow through said bore by longitudinal collapse of said inner sleeve forming a plurality of inward folds.

21. A check valve adapted for insertion in a tubular member having a longitudinal bore therethrough, which comprises:
    a collapsible tubular sleeve positionable longitudinally within said bore of said outer sleeve, said inner sleeve having a longitudinal bore for the substantially unobstructed flow of fluids therethrough, said inner sleeve in the collapsed position having a plurality of multiple, longitudinally spaced, concentric, overlapping inward folds;
    and means for resisting the action of inner sleeve collapsing forces developed responsive to normal flow velocity of fluids through said inner sleeve bore and for developing collapse of said inner sleeve in response to greater than normal flow velocity,
    wherein said inner sleeve essentially plugs said bore during greater than normal fluid flow velocity by longitudinally collapsing and forming a plurality of inward folds thereby obstructing fluid flow.

22. The check valve as claimed in claim 21 including means for anchoring a portion of said inner sleeve to said bore of said tubular member.

23. A check valve, which comprises:

a rigid tubular outer sleeve having a longitudinal bore therethrough and means at the ends thereof for interconnecting said outer sleeve with adjacent tubular members;

a collapsible tubular inner sleeve positioned longitudinally within said bore of said outer sleeve, said inner sleeve having a longitudinal bore for the substantially unobstructed flow of fluids in either direction therethrough, wherein said inner sleeve is both longitudinally collapsible and inwardly foldable, said inner sleeve having a plurality of spaced apart, substantially rigid reinforcing hoops embedded therein;

and means for resisting the action of inner sleeve collapsing forces developed responsive to normal flow velocity of fluids through said inner sleeve bore and for developing collapse of said inner sleeve in response to greater than normal flow velocity.

24. A check valve, which comprises:

a rigid tubular outer sleeve having a longitudinal bore therethrough and means at the ends thereof for interconnecting said outer sleeve with adjacent tubular members;

a collapsible tubular inner sleeve positioned longitudinally within said bore of said outer sleeve, said inner sleeve having a longitudinal bore for the substantially unobstructed flow of fluids in either direction therethrough;

a plurality of fingers in close fitting relation with the inner surface of said inner sleeve with a base of each finger being connected to a second end of said inner sleeve;

and means for resisting the action of inner sleeve collapsing forces developed responsive to normal flow velocity of fluids through said inner sleeve bore and for developing collapse of said inner sleeve in response to greater than normal flow velocity.

* * * * *